(12) United States Patent
Mason et al.

(10) Patent No.: US 8,554,845 B2
(45) Date of Patent: Oct. 8, 2013

(54) METHOD AND APPARATUS FOR AUTOMATICALLY SETTING "OUT OF OFFICE" GREETINGS

(75) Inventors: Andrew Mason, Sunnyvale, CA (US); Michael Sharland, Santa Clara, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 2248 days.

(21) Appl. No.: 10/952,305

(22) Filed: Sep. 27, 2004

(65) Prior Publication Data

US 2006/0075038 A1    Apr. 6, 2006

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 6,434,222 B1 * | 8/2002 | Shaffer et al. | 379/88.13 |
| 6,658,095 B1 | 12/2003 | Yoakam | |
| 6,757,722 B2 | 6/2004 | Lönnfors et al. | |
| 6,804,336 B2 * | 10/2004 | Chiu | 379/100.08 |
| 6,842,505 B1 * | 1/2005 | Suder et al. | 379/88.01 |
| 6,970,547 B2 | 11/2005 | Andrews et al. | |
| 2003/0120732 A1 | 6/2003 | Couts et al. | |
| 2003/0120733 A1 * | 6/2003 | Forman | 709/206 |
| 2004/0003042 A1 * | 1/2004 | Horvitz et al. | 709/204 |
| 2004/0059781 A1 | 3/2004 | Yoakum et al. | |
| 2004/0062383 A1 | 4/2004 | Sylvain | |
| 2004/0122901 A1 | 6/2004 | Sylvain | |
| 2004/0125941 A1 | 7/2004 | Yoakum et al. | |
| 2004/0156484 A1 * | 8/2004 | Amin | 379/88.14 |

* cited by examiner

*Primary Examiner* — Nicholas Taylor
(74) *Attorney, Agent, or Firm* — Buchanan Ingersoll & Rooney PC

(57) ABSTRACT

A telecommunications method includes setting a media server greeting automatically responsive to detection of a change in setting of an e-mail system default message. The e-mail system default message may be an "out of office" outgoing message. The media server greeting may be a voice greeting.

28 Claims, 8 Drawing Sheets

METHOD AND APPARATUS FOR AUTOMATICALLY SETTING "OUT OF OFFICE" GREETINGS

BACKGROUND OF THE INVENTION

1. Field of the Invention

The present invention relate to telecommunications systems and, in particular, to an improved messaging system.

2. Description of the Related Art

In the modern work environment, workers typically have many telecommunications devices at their disposal. For example, a worker may have a desk telephone, a cellular telephone, e-mail, Instant Messaging, etc. As can be appreciated, the worker would be easier to contact if the calling party had some knowledge as to the status of the called party.

Certain e-mail programs allow a user to set a default "Out of Office" message. Briefly, the user can save a message and set it to automatically reply when an incoming message arrives. Similarly, a user can record a new outgoing message for his or her voicemail when he is out of the office.

However, each system requires its own outgoing default message to be manually set. As such, there is a need for a simplified system for leaving an outgoing message on a plurality of messaging systems.

SUMMARY OF THE INVENTION

These and other drawbacks in the prior art are overcome in large part by a system and method according to embodiments of the present invention.

A telecommunications apparatus according to embodiments of the present invention includes a first messaging service; a second messaging service; and a synchronization service configured to synchronize an outgoing message on said first messaging service with an outgoing message on said second messaging service. In some embodiments, the first messaging service is a multimedia messaging service, such as voice mail, and the second messaging service is e-mail. In some embodiments, the apparatus includes or implements a presence service, wherein the synchronization service is configured to receive a presence context from the presence service and make a synchronization determination based thereon. In other embodiments, the apparatus includes a presence service, wherein the synchronization service is configured to receive a presence context from the presence service and make a synchronization query based thereon, the synchronization query including determining whether a predetermined outgoing message on the second messaging service has been set. In addition, in some embodiments, a text-to-speech service may be provided and configured to convert an outgoing e-mail on the one service to a voice greeting on the other.

A telecommunications method according to embodiments of the present invention includes setting a media server greeting automatically responsive to detection of a change in setting of an e-mail system default message. The e-mail system default message may be an "out of office" outgoing message. The media server greeting may be a voice greeting.

A telecommunications system according to embodiments of the present invention includes a network; a plurality of users associated with the network; a first messaging service associated with the network; a second messaging service associated with the network; and a synchronization service configured to synchronize a user's outgoing message on said first messaging service with the user's outgoing message on said second messaging service. According to some embodiments, the system further includes a presence service, wherein the synchronization service is configured to receive a presence context from the presence service and make a synchronization determination based thereon. According to some embodiments, the system includes a presence service, wherein the synchronization service is configured to receive a presence context from the presence service and make a synchronization query based thereon, the synchronization query including determining whether a predetermined outgoing message on the second messaging service has been set.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
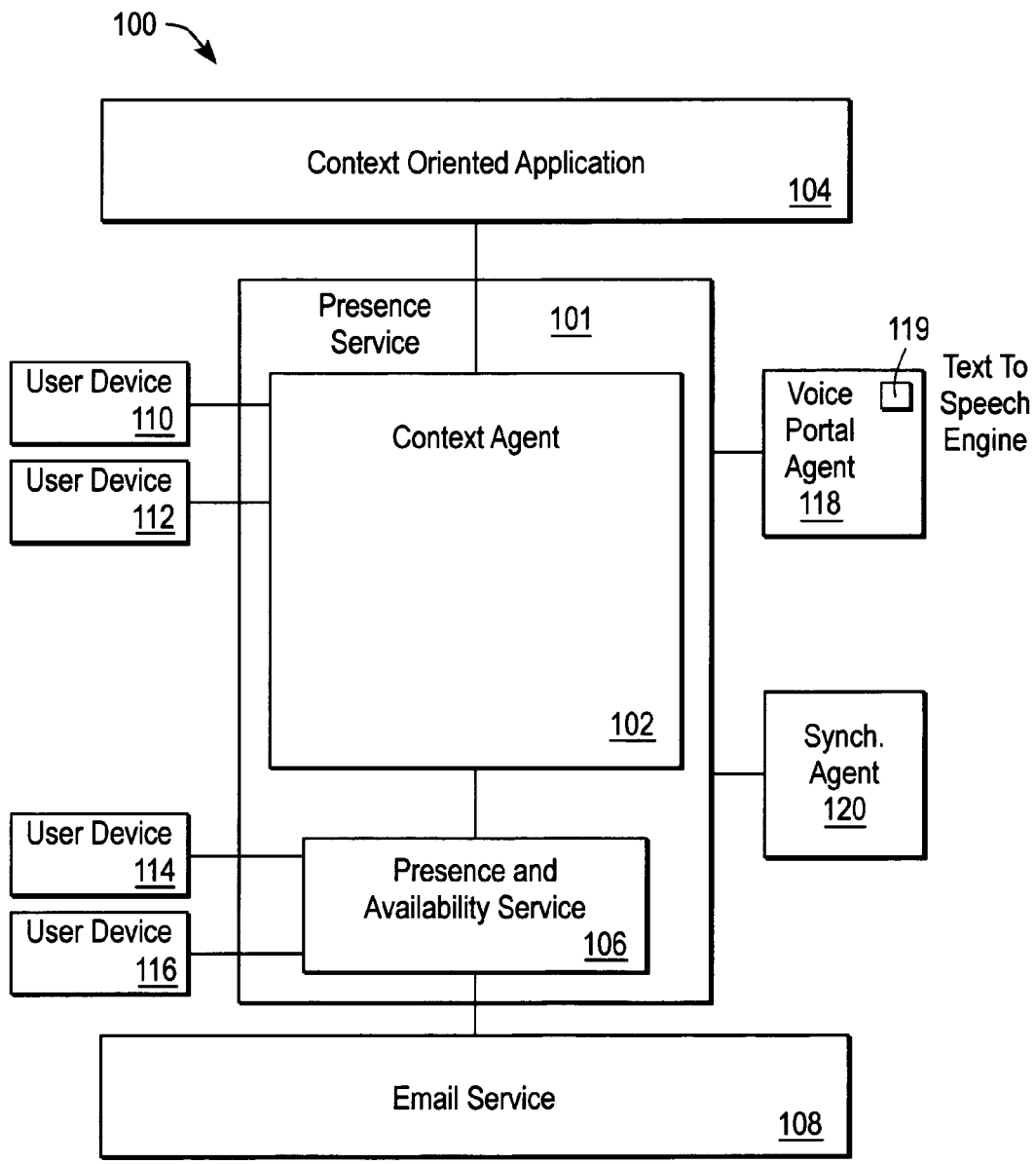
FIG. 1 is a diagram illustrating a system according to embodiments of the present invention.

Turning now to the drawings and, with particular attention to FIG. 1, a diagram of a telecommunications system 100 according to an embodiment of the present invention is shown. The system includes a presence service 101 connected to or in communication with an e-mail messaging service 108, a voice portal service 118, and a synchronization service or agent 120. In addition, the presence service 101 may be connected to or in communication with a context oriented application 104. The presence service 101 may include a presence and availability service (PAS) 106 and a context agent 102.

User devices, such as user devices 110, 112, 114, 116 may be connected to or in communication with the presence service 101, the voice portal agent 118, the e-mail service 108, and the synchronization agent 120. In certain embodiments, the user devices may be implemented as telephones, cellular telephones, PDAs, computers, etc. For example, a user device 110, 112, 114, 116 may be embodied as personal computers implementing the Windows XP operating system and the Windows Messenger instant messenger system. In addition, the user devices 110, 112, 114, 116 may include telephony and other multimedia messaging capability using, for example, peripheral cameras, Webcams, microphones, and speakers (not shown) or peripheral telephony handsets, such as the Optipoint handset available from Siemens Information and Communication Networks, Inc.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The voice portal agent 118 forms an interface to, for example, incoming telephone calls and can also include a media agent for multimedia messaging. For example, the voice portal 118 may include a voice messaging system. In addition, the voice portal agent 118 may include a text-to-speech engine 119, as will be discussed in greater detail below. Such a text-to-speech engine 119 may operate to receive a body of text and convert it into a corresponding audio message. The voice portal agent 118 may be implemented in hardware and/or software operating on one or more servers, computer systems, host or mainframe computers, workstations, etc. In some embodiments, the voice portal agent 118 may be operating on some or all of the same devices as other components in the system 100.

The context agent 102 may monitor the identity context of one or more identities or the device context of one or more devices. The context agent 102 may provide or include an application interface that supports identity context, device context, device presence, and/or other functions. Applications may monitor, access, and/or query the context agent 102 for identity context and/or device context information. The context agent 102 may be implemented in hardware and/or software operating on one or more servers, computer systems, host or mainframe computers, workstations, etc. In some embodiments, the context agent 102 may be operating on some or all of the same devices as other components in the system 100.

The PAS 106 may be or include an application that monitors the presence and availability of devices. That is, the PAS 106 monitors the device context of one or more devices. In some embodiments, one or more of the devices may be associated with identities whose context may be used or monitored by the context oriented application 104. The PAS 106 may be implemented in hardware and/or software operating on one or more servers, computer systems, host or mainframe computers, workstations, etc. In some embodiments, the PAS 106 may be operating on some or all of the same devices as other components in the system 100.

In some embodiments, the PAS 106 may be or include an application that communicates with or is connected to one or more registered devices (e.g., devices 110, 112, 114, 116) that allows devices to register with the system 100 or helps to facilitate their registration. For example, in a SIP environment, the devices 110, 112, 114, 116 may be registered with the system 100 and may show up or be described in registration databases as being assigned to particular identities. The context agent 102 may register with the PAS 106 and receive device context and/or information from the PAS 106 regarding the devices 110, 112, 114, 116. In some embodiments, the PAS 106 may provide context information to the context oriented application upon request, periodically or in accordance with some other plan or procedure.

The e-mail service 108 may provide e-mail server functions for one or more users 110, 112, 114, 116, which may include e-mail applications, as will be described in greater detail below. The e-mail service 108 may implement a function allowing a user to set a default "Out of Office" e-mail message when an incoming message to the user arrives. An exemplary e-mail service and application is the Microsoft Outlook/Exchange server system. The e-mail service 108 may be implemented in hardware and/or software operating on one or more servers, computer systems, host or mainframe computers, workstations, etc. In some embodiments, the e-mail service 108 may be operating on some or all of the same devices as other components in the system 100.

The synchronization agent 120 functions to monitor the e-mail service 108 for the setting of the "Out of Office" outgoing default message. The synchronization agent 120 may also monitor the device context of the device corresponding to the "Out of Office" outgoing message being set. If the message is set, or the context indicates "Out of Office," "On Vacation," (or similar indicia), the synchronization agent 120 operates to generate an outgoing voice message corresponding to the "Out of Office" e-mail message. In particular, the synchronization agent 120 may operate in conjunction with the voice portal agent 118 to perform a text-to-speech analysis of the "Out of Office" outgoing default e-mail message and generate a corresponding voice message, prompt, or greeting for the voice portal. Alternatively, the synchronization agent 120 could be used to store one or more voice messages, prompts, or greetings that can be caused to be accessed when the "Out of Office" e-mail is detected as having been set. The synchronization agent 120 may be implemented in hardware and/or software operating on one or more servers, computer systems, host or mainframe computers, workstations, etc. In some embodiments, the synchronization agent 120 may be operating on some or all of the same devices as other components in the system 100.

Figure 2:
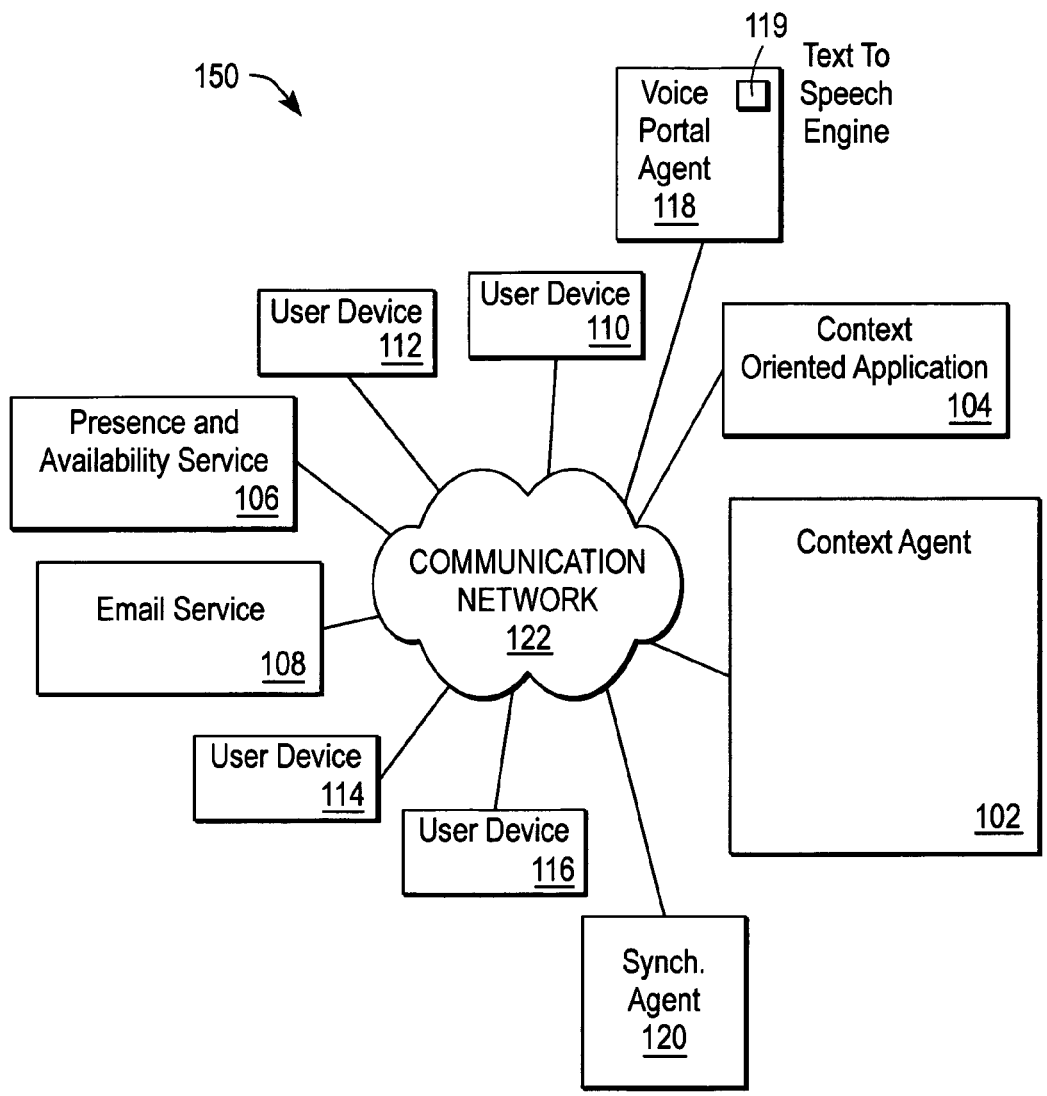
FIG. 2 is a diagram illustrating a system according to embodiments of the present invention.

In certain embodiments of the present invention, one or more of the components of the system 100 may be connected to or in communication with each other via a communication network. For example, turning now to FIG. 2, a system 150 including the components of the system 100 is illustrated, wherein some or all of the components are in communication via a network 122. The network 122 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP).

Figure 3:
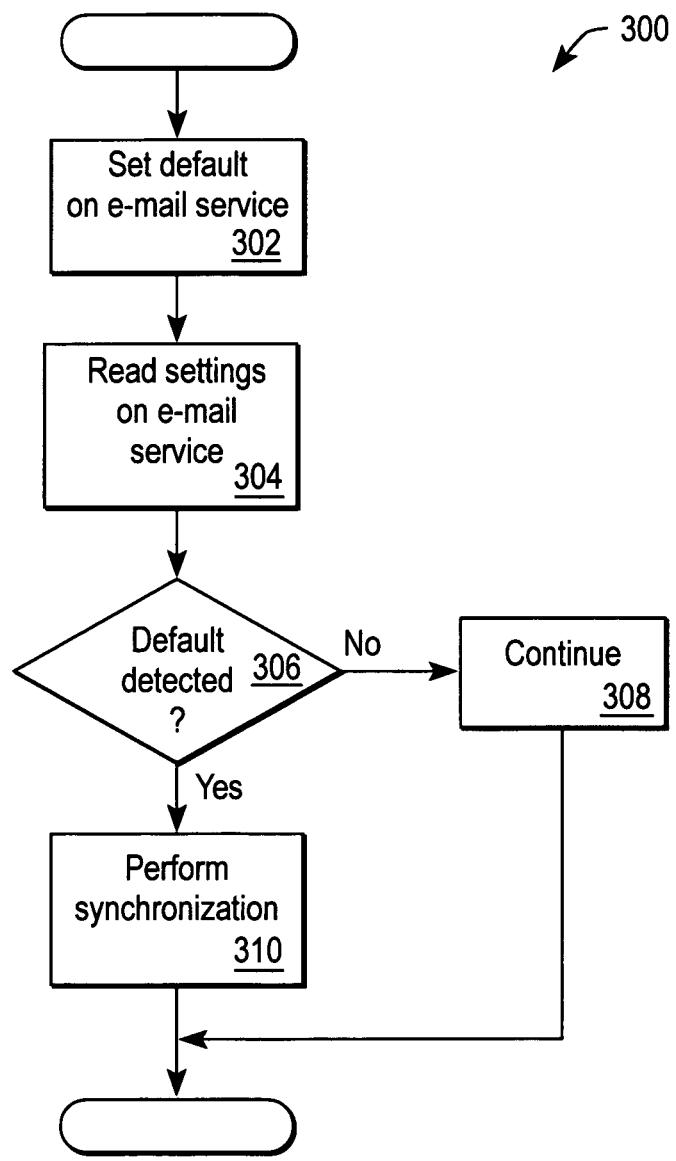
FIG. 3 is a flowchart illustrating operation of an embodiment of the present invention.

Turning now to FIG. 3, a flowchart 300 illustrating operation of embodiment of the present invention is shown. The particular arrangement of elements in the flowchart 300 is not meant to imply a fixed order to the elements; embodiments can be practiced in any order that is practicable.

In a step 302, a default outgoing message in a messaging service, such as a default outgoing e-mail on an e-mail service, is set. For example, a user may make use of an e-mail client program operating on or in association with a client device, to set a default message. For example, a user may set an "Out of Office" message. Such a message may include text such as, for example, "John Doe is out of the office and will return 01/01/01. If the matter is urgent, please contact my secretary at 555-1212." The messaging system 108 (FIG. 1) will receive and store the message for use as a response when incoming messages are received for the user.

In a step 304, the synchronization agent 120, for example, can make a synchronization query and read the settings on the messaging system 108. That is, periodically or occasionally, or on some other basis, the synchronization agent 120 can read the messaging system settings to determine if a default "Out of Office" message has been set.

In a step 306, the synchronization agent 120 will determine if the default message has been set. If so, then in a step 310, the synchronization agent 120 will synchronize a message from the media service (i.e., voice messaging) to the default message. For example, the synchronization agent 120 could read the outgoing Message and generate an outgoing message for the media or voice mail service 118 using a text-to-speech service 119. Alternatively, the synchronization agent 120 could access one of one or more previously stored outgoing voice messages, greetings, or prompts that correspond to the outgoing e-mail message. Otherwise, in step 308, the system will continue to monitor.

Figures 4, 5:
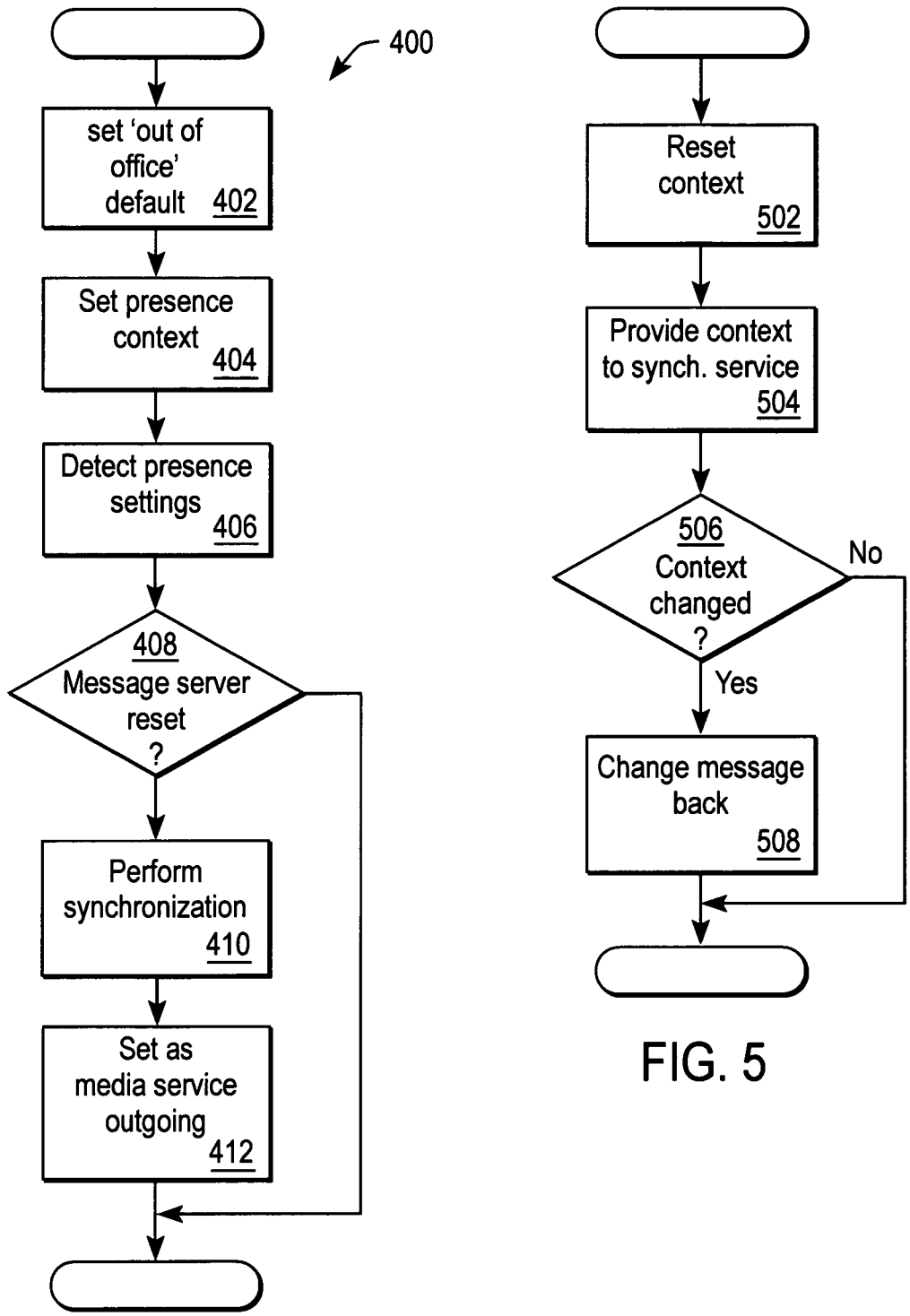
FIG. 4 is a flowchart illustrating operation of embodiments of the present invention.
FIG. 5 is a flowchart illustrating operation of embodiments of the present invention.

FIG. 4 is a flowchart illustrating operation of another embodiment of the present invention. The particular arrangement of elements in the flowchart 400 is not meant to imply a fixed order to the elements; embodiments can be practiced in any order that is practicable. In a step 402, the user device's messaging client can be used to set a default outgoing message, such as a default outgoing e-mail on an e-mail service 108. For example, a user may make use of an e-mail client program to set a default message such as an "Out of Office" or "On Vacation" or "On Business Trip" message or similar message. Such a message may include text such as, for example, "John Doe is out of the office and will return 01/01/01. If the matter is urgent, please contact my secretary at 555-1212." The messaging system 108 will receive and store the message for use as a response when incoming messages are received for the user.

In a step 404, the user can also set a presence context. For example, in certain embodiments, the user can employ a media server client associated with the user device to set a presence context with the presence service 101. That is, the user may employ his client to send a presence context, such as Out of Office, to the presence service 101. At a step 406, the synchronization agent 120 detects the presence settings. For example, the synchronization agent could have registered with the presence service 101 to receive presence information.

At a step 408, the synchronization agent 120 can make a synchronization query and determine if a presence context setting indicative of a predetermined default message has been set. For example, the Out of Office presence context could be associated with an Out of Office default outgoing e-mail. If so, then in a step 410, the synchronization agent 120 will access the associated default message from the e-mail service 108 and perform a synchronization to the outgoing message for a media service such as the voice portal 118. In particular, in certain embodiments, in which the media service includes a voice service (e.g., voice mail or an interactive voice response service), the default outgoing message may be converted into a speech message, prompt, or greeting. Alternatively, as discussed above, the synchronization agent 120 could access a previously stored message.

Finally, in a step 412, the synchronization agent 120 will communicate with or cause the voice portal 118 to set the converted message as the new default outgoing voice message.

FIG. 5 is a flowchart illustrating operation of another embodiment of the present invention. The particular arrangement of elements in the flowchart 500 is not meant to imply a fixed order to the elements; embodiments can be practiced in any order that is practicable. More particularly, FIG. 5 illustrates deactivating the new default once, for example, the user returns to the office. For example, at a step 502, the user can employ his presence client program (e.g., at the user device) to change the presence context back to "In Office," or similar designation.

The presence service 101 provides the presence context to the synchronization agent 120 in a step 504. In a step 506, the synchronization agent 120 determines that the context has changed from Out of Office. In a step 508, the synchronization agent 120 directs the media service, e.g., the voice portal, to change the outgoing message from the "Out of Office" message to the standard default. It is noted that, in alternate embodiments, the synchronization agent 120 can detect the resetting of the outgoing e-mail message default, in addition to or instead of detecting the context change.

Figure 6A:
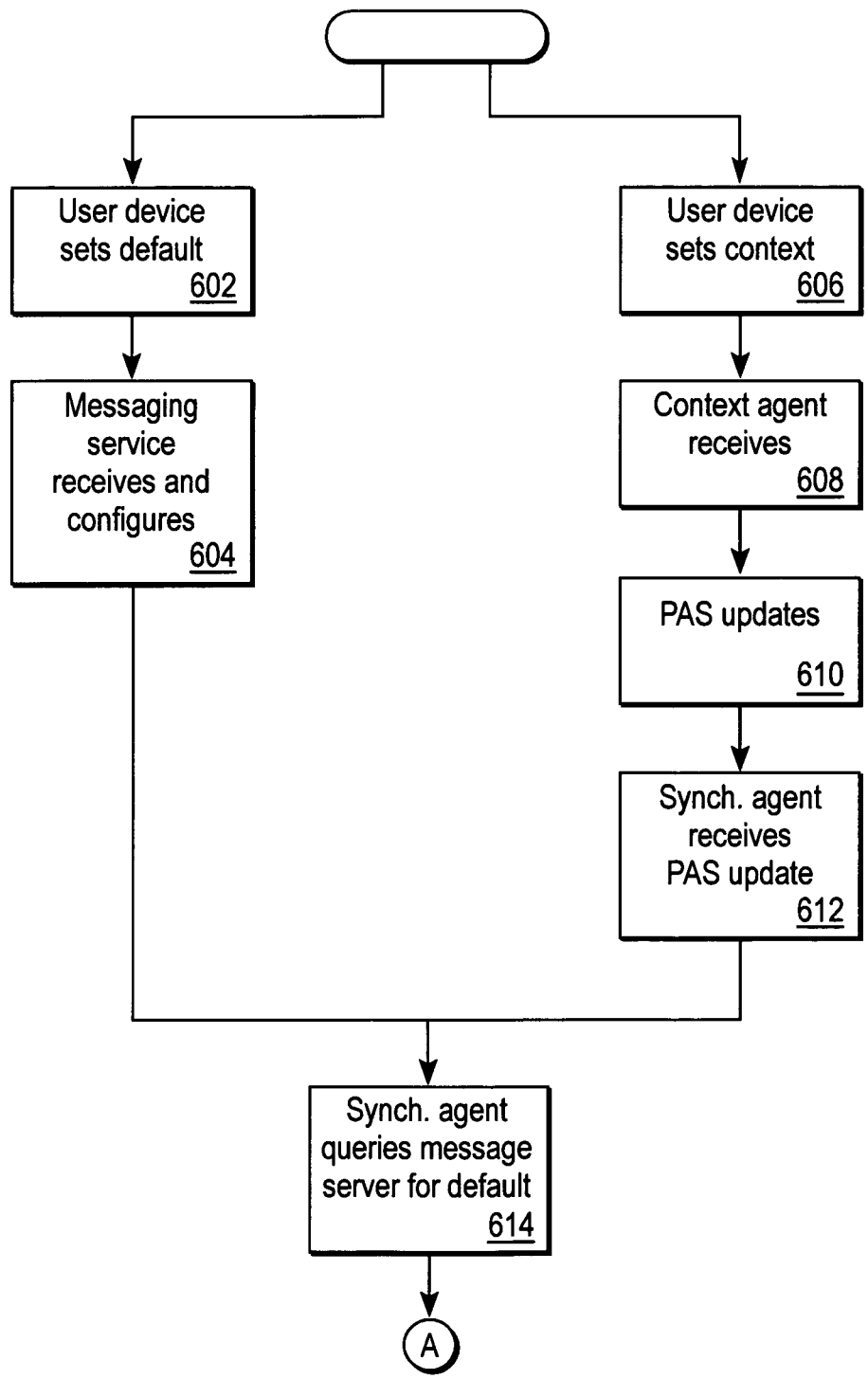
FIG. 6A and FIG. 6B is a flowchart illustrating operation of embodiments of the present invention.
Figure 6B:
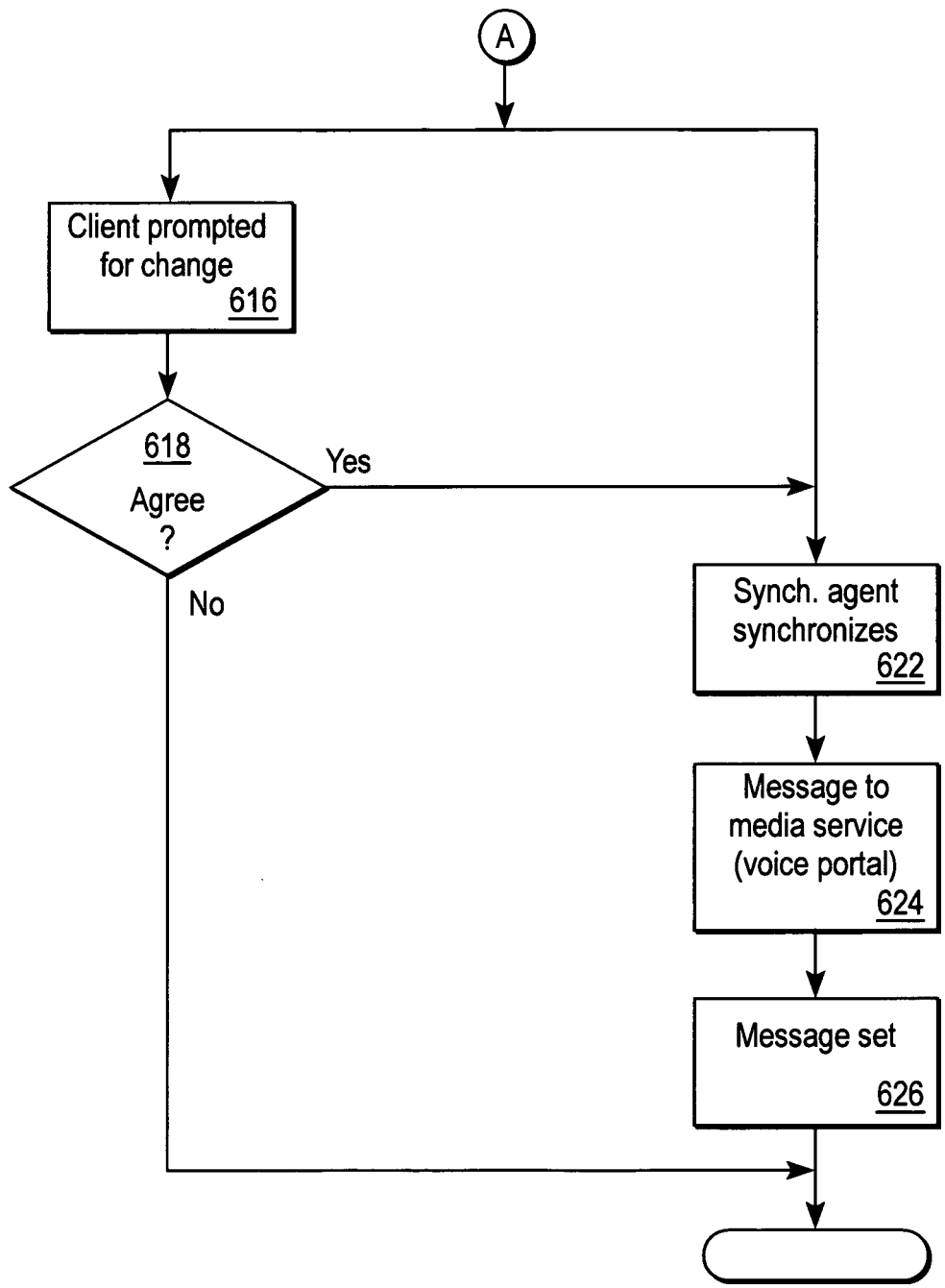

FIG. 6A and FIG. 6B is a flowchart illustrating operation of another embodiment of the present invention. The particular arrangement of elements in the flowchart 600 is not meant to imply a fixed order to the elements; embodiments can be Practiced in any order that is practicable.

In a step 602, a user device can set a default outgoing "Out of Office" message. As discussed above, this can include, for example, the user composing and sending the message to the messaging service, such as e-mail service 108. In a step 604, the default message is received by the service 108 and set as the default.

Alternatively, or in addition to, steps 602, 604, the user device may be used to set a presence context, in a step 606. This may be accomplished, for example, by the user activating and using a suitable client program. In a step 608, the context agent 102 will set the new context, and the presence and availability service 106 will make it available to context oriented applications, in a step 610. The synchronization agent 120 can receive the presence context update from the presence and availability service 106 or the context agent 102, in a step 612.

In a step 614, the synchronization agent 120 can determine that there has been a change in the state of the user and therefore may need to be an update of the outgoing message on the other messaging service, e.g., the media service or voice portal. For example, the synchronization agent 120 can detect, query, etc., either or both of the messaging server setting (i.e., that a default has been set) or the change in presence context.

In a step 616, the synchronization agent 120 can prompt the user as to whether the outgoing media server message should be changed to correspond to the outgoing e-mail message. For example, the synchronization agent 120 could communicate with the messaging service 108 or voice portal agent 118 to cause the user's client program to display a popup window on his graphical user interface. If the user elects "yes," for example, by selecting a button, the response is provided to the synchronization agent 120. The synchronization agent 120 can then perform the synchronization, in a step 622. For example, the synchronization agent 120 could receive the e-mail message from the messaging service 108 and provide it to a text-to-speech unit associated with the voice portal 118. The speech-converted message is then provided to the media server or voice portal 118 for use as the outgoing voice message, in a step 624. The message is set as the outgoing message, in a step 626.

Figure 7:
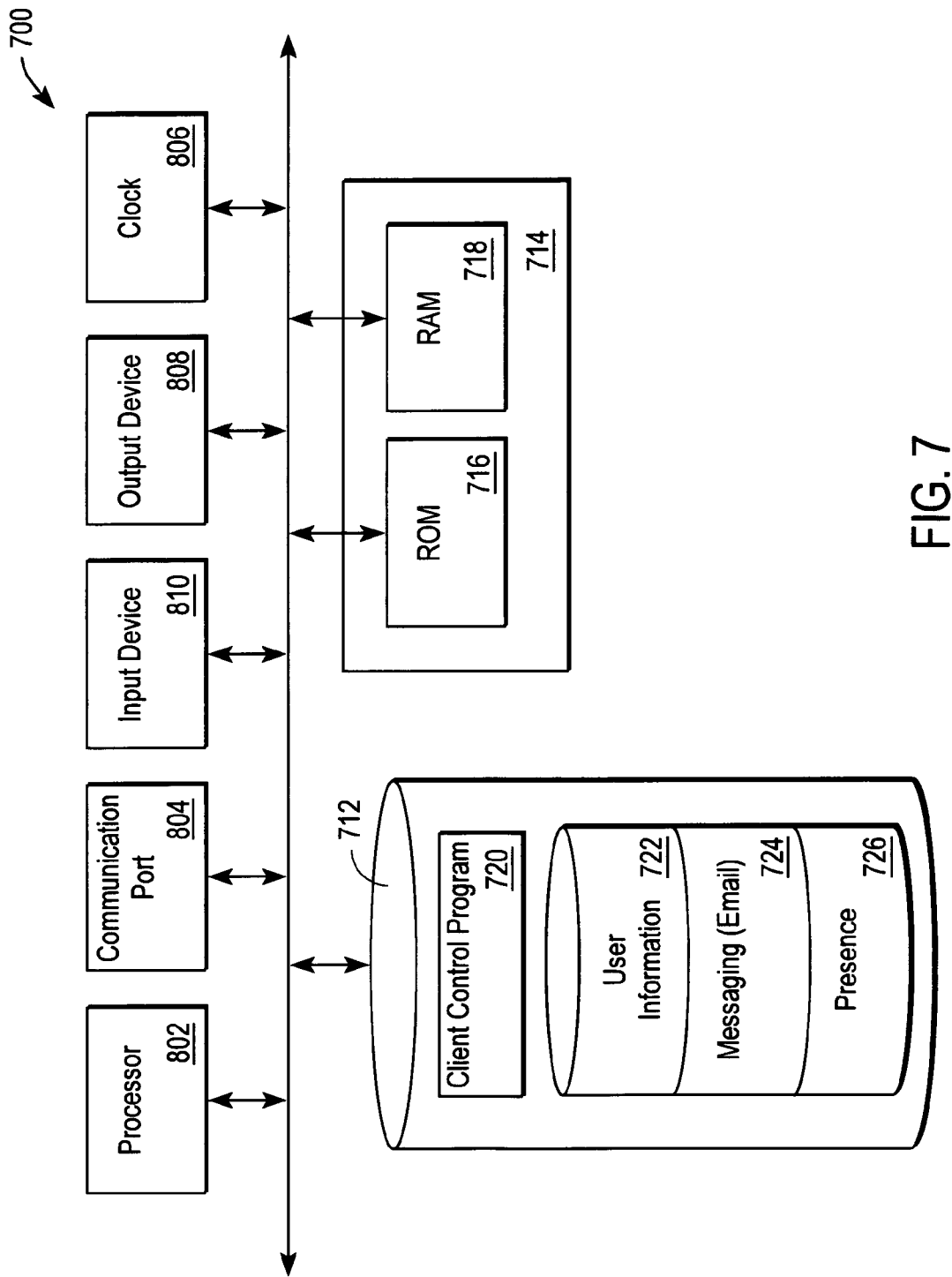
FIG. 7 is a block diagram of an apparatus according to an embodiment of the present invention.

Now referring to FIG. 7, a representative block diagram of a computer or processing device 700 suitable for use as a user device according to embodiments of the present invention is shown. In some embodiments, the computer 700 may include or operate a messaging client and a presence client. The computer 700 may be embodied as a single device or computer, a networked set or group of devices or computers, a workstation, mainframe or host computer, etc. In some embodiments, the server 700 may implement one more elements of the methods disclosed herein.

The computer 700 may include a processor, microchip, central processing unit, or computer 702 that is in communication with or otherwise uses or includes one or more communication ports or network interfaces 704 for communicating with user devices and/or other devices. The communication ports 704 may include such things as local area network adapters, wireless communication devices, Bluetooth technology, etc. The computer 700 also may include an internal clock element 706 to maintain an accurate time and date for the computer 700, create time stamps for communications received or sent by the computer 700, etc.

If desired, the computer 700 may include one or more output devices 708 such as a printer, infrared or other transmitter, antenna, audio speaker, display screen or monitor, text to speech converter, etc., as well as one or more input devices 710 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the computer 700 may include a memory or data storage device 712 to store information, software, databases, documents, communications, device drivers, etc. The memory or data storage device 712 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 712 may include various combinations of moveable and fixed storage. The computer 700 also may include memory 714, such as ROM 716 and RAM 718.

The processor 702 and the data storage device 712 in the computer 700 each may be, for example: (i) located entirely within a single computer or other computing device; or (ii) connected to each other by a remote communication medium, such as a serial port cable, telephone line or radio frequency transceiver. In one embodiment, the computer 700 may be implemented as one or more computers that are connected to a remote server computer, as will be explained in greater detail below.

A conventional personal computer or workstation with sufficient memory and processing capability may be used as the computer 700. The computer 700 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 702. Other suitable processors may be available from Motorola, Inc., AMD, or Sun Microsystems, Inc. The processor 702 also may be embodied as one or more microprocessors, computers, computer systems, etc.

Software may be resident and operating or operational on the computer 700. The software may be stored on the data storage device 712 and may include a client control program 720 for operating the computer. The client control program 720 may include a message client control program 724 and a presence client control program 726. The message client control program 724 may be used to interface with a messaging service, such as the e-mail messaging service 108. In addition, the message client control program 724 may allow interaction with a media service such as the voice portal 118. The presence client control program 726 may allow the user device to interact with the presence service 101.

The client control program 720 may control the processor 702. The processor 702 may perform instructions of the client control program 720, and thereby operate in accordance with the methods described in detail herein. The client control program 720 may be stored in a compressed, uncompiled and/or encrypted format. The client control program 720 furthermore may include program elements that may be necessary, such as an operating system, a database management system and device drivers for allowing the processor 702 to interface with peripheral devices, databases, etc. Appropriate program elements are known to those skilled in the art, and need not be described in detail herein.

The computer 700 also may include or store user information 722 information regarding identities, user devices, contexts, presence information, communications, etc. These may include, for example, default messages, etc. Information regarding other application program data may be stored in application databases (not shown)

According to some embodiments, the instructions of the control program may be read into a main memory from another computer-readable medium, such as from the ROM 716 to the RAM 718. Execution of sequences of the instructions in the control program causes the processor 702 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 702, communication ports 704, clock 706, output device 708, input device 710, data storage device 712, ROM 716 and RAM 718 may communicate or be connected directly or indirectly in a variety of ways. For example, the processor 702, communication ports 704, clock 706, output device 708, input device 710, data storage device 712, ROM 716 and RAM 718 may be connected via a bus 734.

While specific implementations and hardware/software configurations for the computer 700 have been illustrated, it should be noted that other implementations and hardware configurations are possible and that no specific implementation or hardware/software configuration is needed. Thus, not all of the components illustrated in FIG. 7 may be needed for the computer 700 implementing the methods disclosed herein.

Figure 8:
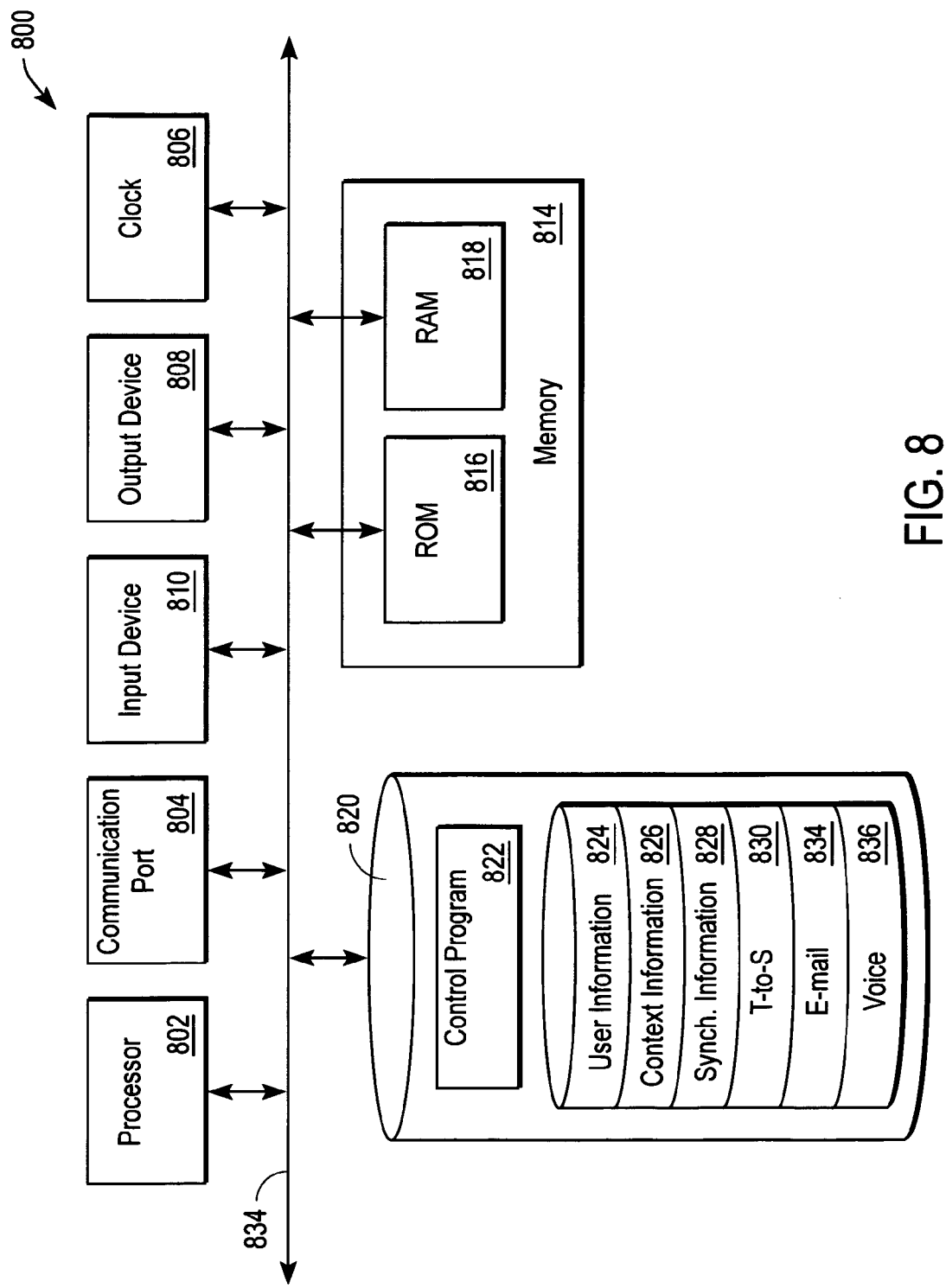
FIG. 8 is a block diagram of an apparatus according to an embodiment of the present invention.

FIG. 8 is a diagram illustrating a server 800 according to embodiments of the present invention. In some embodiments, the server 800 may include or operate a context oriented application, the context agent 102, and/or the presence and availability service 106, as well as the voice portal agent 118, synchronization agent 120, and e-mail services 108. The server 800 may be embodied as a single device or computer, a networked set or group of devices or computers, a workstation, mainframe or host computer, etc. In some embodiments, the server 800 may implement one more elements of the methods disclosed herein.

The server 800 may include a processor, microchip, central processing unit, or computer 802 that is in communication with or otherwise uses or includes one or more communication ports 804 for communicating with user devices and/or other devices. The communication ports 804 may include such things as local area network adapters, wireless communication devices, telephone network adapters, Bluetooth technology, etc. The server 800 also may include an internal clock element 806 to maintain an accurate time and date for the server 800, create time stamps for communications received or sent by the server 800, etc.

If desired, the server 800 may include one or more output devices 808 such as a printer, infrared or other transmitter, antenna, audio speaker, display screen or monitor, text to speech converter, etc., as well as one or more input devices 810 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 800 may include a memory or data storage device 820 to store information, software, databases, documents, communications, device drivers, etc. The memory or data storage device 820 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 800 also may include memory 814, such as ROM 816 and RAM 818.

The processor 802 and the data storage device 820 in the server 800 each may be, for example: (i) located entirely within a single computer or other computing device; or (ii) connected to each other by a remote communication medium, such as a serial port cable, telephone line or radio frequency transceiver. In one embodiment, the server 800 may be implemented as one or more computers that are connected to a remote server computer for maintaining databases.

A conventional personal computer or workstation with sufficient memory and processing capability may be used as the server 800. The server 800 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 802. Other suitable processors may be available from Motorola, Inc., AMD, or Sun Microsystems, Inc. The processor 802 also may be embodied as one or more microprocessors, computers, computer systems, etc.

Software may be resident and operating or operational on the server 800. The software may be stored on the data storage device 820 and may include a control program 822 for operating the server, databases, etc. The control program 822 may include an e-mail server program 834, a synchronization agent program 828, a text-to-speech agent 830, and a voice portal agent program 836.

The control program 822 may control the processor 802. The processor 802 may perform instructions of the control program 820, and thereby operate in accordance with the methods described in detail herein. The control program 822 may be stored in a compressed, uncompiled and/or encrypted format. The control program 822 furthermore includes program elements that may be necessary, such as an operating system, a database management system and device drivers for allowing the processor 802 to interface with peripheral devices, databases, etc. Appropriate program elements are known to those skilled in the art, and need not be described in detail herein.

The server 800 also may include or store information regarding identities, user devices, contexts, presence information, communications, outgoing default messages, etc. For example, information regarding one or more identities may be stored in an identity information database 824 for use by the server 800 or another device or entity. Information regarding one or more identity or device contexts may be stored in a context information database for use by the server 800 or another device or entity; information regarding presence rules may be stored in a presence information database 826 for use by the server 800 or another device or entity; and information regarding other application program data may be stored in application database (not shown). In some embodiments, some or all of one or more of the databases may be stored or mirrored remotely from the server 800.

According to some embodiments, the instructions of the control program may be read into a main memory from another computer-readable medium, such as from the ROM 816 to the RAM 818. Execution of sequences of the instructions in the control program causes the processor 802 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 802, communication ports 804, clock 806, output device 808, input device 810, data storage device 812, ROM 816, and RAM 818 may communicate or be connected directly or indirectly in a variety of ways. For example, the processor 802, communication ports 802, clock 806, output device 808, input device 810, data storage device 812, ROM 816, and RAM 818 may be connected via a bus 834.

While specific implementations and hardware/software configurations for the server 800 have been illustrated, it should be noted that other implementations and hardware configurations are possible and that no specific implementation or hardware/software configuration is needed. Thus, not all of the components illustrated in FIG. 8 may be needed for the server 800 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A telecommunications apparatus, comprising:
    a first messaging service;
    a second messaging service; and
    a synchronization agent automatically querying said second messaging service for a current outgoing message for second messaging service users and monitoring for changes in whether a default outgoing message is set and configured to selectively synchronize an outgoing message on said first messaging service with said current default outgoing message on said second messaging service, synchronization being selected responsive to changes in said current default outgoing message.

2. A telecommunications apparatus in accordance with claim 1, wherein the second messaging service is an e-mail service.

3. A telecommunications apparatus in accordance with claim 2, wherein the first messaging service is a multimedia service.

4. A telecommunications apparatus in accordance with claim 3, further including a presence service, wherein the synchronization agent further automatically queries and monitors presence context from the presence service and is configured to select and make a synchronization determination based thereon.

5. A telecommunications apparatus in accordance with claim 3, further including a presence service, wherein the synchronization agent further automatically queries and monitors presence context from the presence service and is configured to select and make a synchronization query based thereon, the synchronization query including determining whether said default outgoing message on the second messaging service has been set.

6. A telecommunications apparatus in accordance with claim 5, wherein the default outgoing message on the second messaging service comprises a default outgoing e-mail; and, wherein other than said default outgoing e-mail being set indicates that the second messaging service has been reset.

7. A telecommunications apparatus in accordance with claim 6, wherein the outgoing message on the first messaging service comprises a voice greeting.

8. A telecommunications apparatus in accordance with claim 7, further including a text-to-speech service configured to convert said default outgoing e-mail to said voice greeting.

9. A telecommunications apparatus in accordance with claim 1, wherein the default outgoing message on the second messaging service comprises a default outgoing e-mail; and, wherein other than said default outgoing e-mail being set indicates that the second messaging service has been reset.

10. A telecommunications apparatus in accordance with claim 9, wherein the outgoing message on the first messaging service comprises a voice greeting and wherein upon determining that the second messaging service has been reset, the synchronization agent resets synchronization of outgoing messages on said first messaging service.

11. A telecommunications apparatus in accordance with claim 10, further including a text-to-speech service configured to convert said default outgoing e-mail to said voice greeting.

12. A telecommunications apparatus, comprising:
    a presence service;
    a media service; and
    a synchronization agent automatically querying said presence service for a current presence state for presence service users, monitoring for presence state changes and configured to selectively perform a synchronization of an outgoing message on said media service responsive to presence state changes, synchronization being selected responsive to changes in said current default outgoing message.

13. A telecommunications apparatus in accordance with claim 12, wherein the synchronization agent periodically queries current presence state and determines if a predetermined outgoing message has been set on a messaging service and synchronizes an outgoing message on said media service in response thereto.

14. A telecommunications apparatus in accordance with claim 13, wherein the predetermined outgoing message is a default e-mail message and the synchronized outgoing message is a voice message.

15. A telecommunications system, comprising:
    a network;
    a plurality of network devices each associated with a network user;
    a first messaging service associated with the network;
    a second messaging service associated with the network; and
    a synchronization agent associated with said network and communicating with said first messaging service and said second messaging service over said network, said synchronization agent automatically sending outgoing message queries over said network to said second messaging service, said synchronization agent monitoring response to said queries from said second messaging service for changes in whether a default outgoing message for each network user is set and configured to selectively synchronize corresponding outgoing user messages on said first messaging service with corresponding outgoing user messages on said second messaging service when a respective said default outgoing message is set, other than said default outgoing message being set indicating that the second messaging service has been reset, synchronization being selected responsive to changes in said current default outgoing message.

16. A telecommunications system in accordance with claim 15, wherein the second messaging service is an e-mail service.

17. A telecommunications system in accordance with claim 16, wherein the first messaging service is a multimedia service.

18. A telecommunications system in accordance with claim 16, further including a presence service, wherein the synchronization agent further automatically queries and monitors presence context from the presence service and makes a synchronization determination based thereon.

19. A telecommunications system in accordance with claim 16, further including a presence service, wherein the synchronization agent further automatically queries and monitors presence context from the presence service and makes a synchronization query based thereon, the synchronization query including determining whether said default outgoing message on the second messaging service has been set.

20. A telecommunications system in accordance with claim 19, wherein said synchronization agent periodically sends outgoing message queries over said network and the default outgoing message on the second messaging service comprises a default outgoing e-mail indicating absence of a respective user.

21. A telecommunications system in accordance with claim 20, wherein the outgoing message on the first messaging service comprises a voice greeting.

22. A telecommunications system in accordance with claim 21, further including a text-to-speech service configured to convert said default outgoing e-mail to said voice greeting.

23. A telecommunications system in accordance with claim 15, wherein the default outgoing message on the second messaging service comprises a default outgoing e-mail and wherein upon determining that the second messaging service has been reset, the synchronization agent resets synchronization of outgoing messages on said first messaging service.

24. A telecommunications system in accordance with claim 23, wherein the outgoing message on the first messaging service comprises a voice greeting.

25. A telecommunications system in accordance with claim 24, further including a text-to-speech service configured to convert said default outgoing e-mail to said voice greeting.

26. A telecommunications method, comprising:

automatically querying each of a plurality of messaging services about changes in an outgoing message and monitoring each for changes in whether a respective default outgoing message is set for each network user, said plurality of messaging services including an e-mail system;

selectively setting a media server greeting for a respective network user automatically, setting said media server greeting being selected responsive to detection of a change in setting of an e-mail system default message for said respective network user; and selectively resetting said media server greeting for said respective network user, setting said media server greeting being selected automatically responsive to detection of resetting of said e-mail system default message for said respective network user.

27. A telecommunications method in accordance with claim 26, wherein automatically querying comprises periodically querying and said e-mail system default message comprises an "out of office" outgoing message.

28. A telecommunications method in accordance with claim 27, wherein said media server greeting is a voice greeting.

* * * * *